United States Patent Office 2,885,438
Patented May 5, 1959

2,885,438

PROCESS FOR THE PREPARATION OF POLYMERIZABLE ACRYLAMIDO METHYLENE UREAS

Daniel Porret and Ernst Leumann, Monthey, Switzerland, assignors to Ciba Limited, Basel, Switzerland, a Swiss firm No Drawing. Application November 5, 1953
Serial No. 390,418

Claims priority, application Switzerland
November 26, 1952

3 Claims. (Cl. 260—553)

This invention relates to the manufacture of polymerizable compounds.

The invention is based on the observation that polymerizable amide-like products are obtained when amide-like compounds, which are capable of forming methylol compounds with formaldehyde, are reacted in the presence of acid condensing agents with formaldehyde or substances providing formaldehyde and with nitriles of polymerizable or copolymerizable acids.

As amide-like compounds which are capable of forming methylol compounds with formaldehyde, any carboxylic acid amides can be used which contain on the nitrogen atom at least one hydrogen atom, so long as they do not undergo transformation in an undesirable manner under the conditions of the reaction. The acid amides may be derived, for example, from the following carboxylic acids: formic acid, acetic acid, propionic acid, butyric acid, lauric acid, stearic acid, oleic acid, coconut oil fatty acid, naphthenic acids, oxalic acid, succinic acid, adipic acid, fumaric acid, maleic acid, lactic acid, glycollic acid, chloracetic acid, acetyl glycocoll, toluic acid, anisic acid, phthalic acid, isophthalic acid, terephthalic acid, benzene tricarboxylic acids, cinnamic acid, hydrocinnamic acid, p-nitrobenzoic acid, m-sulfobenzoic acid, salicylic acid, furane-α-carboxylic acid or benzimidazyl-β-propionic acid.

As amide-like compounds there can also be used compounds of the urea group or of the aminotriazine group. As compounds of the urea group there may be mentioned for example, urea and thiourea.

Among the compounds of the aminotriazine series melamine is of primary importance, but other compounds can also be used, such as melam, melem, ammeline, ammelide, an halogensubstituted aminotriazines such as 2-chloro-4:6-diamino-1:3:5-triazine and also guanamines, such as benzoguanamine, acetoguanamine, or formoguanamine, and finally guanyl melamines.

The formaldehyde is advantageously employed in the form of a concentrated aqueous solution or as paraformaldehyde. Substances providing formaldehyde, such as hexamethylene tetramine are also useful.

The unsaturated nitriles which are to be used as the other components for the process of this invention, may be derived from any aliphatic, cycloaliphatic, araliphatic or heterocyclic mono- or polybasic carboxylic acids which contain one or more double or triple bonds and are polymerizable or copolymerizable. Of particular advantage are nitriles of α:β-unsaturated carboxylic acids of the general formula

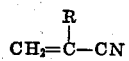

in which R stands for hydrogen, chlorine or an alkyl radical. There may be mentioned by way of example, furylacrylic acid nitrile, cinnamic acid nitrile, methacrylic acid nitrile, muconic acid dinitrile, crotonic acid nitrile, acetylene dicarboxylic acid dinitrile, phenylpropiolic acid nitrile, α-chloracrylic acid nitrile and especially acrylic acid nitrile. Acrylic acid nitrile is of particular importance on account of its easy availability and reactivity.

As acid condensing agents in the presence of which the condensation according to this invention takes place, there are preferably concerned strong inorganic acids, such as phosphoric acid and especially sulfuric acid, which are advantageously used in anhydrous form. The condensing agent is advantageously added in excess. If desired, an inert organic solvent such as tetrahydrofurane or glacial acetic acid, can also be added to the reaction mixture. The reaction temperatures which must be observed for the manufacture of the individual amide-like compounds cannot be definitely specified. They depend very much upon the starting materials used. In some cases it is of advantage to cool the reaction mixture with a mixture of ice and common salt and to introduce the individual components in only small quantities at a time. In other cases, on the other hand, a prolonged heating to elevated temperatures, for example 70–90° C., may be necessary. Some indication as to the most favorable reaction conditions is given by the amount of heat evolved on mixing all the components. When the condensation is complete, the reaction mixture is advantageously poured into water and the free acid neutralized. The amide-like condensation products which result can subsequently be separated by filtration or recovered by extraction with an organic solvent.

The selection of the quantity proportions of the individual reaction components and the selection of the components themselves depends upon the properties which it is desired to impart to the final product. If it is required to produce products which are homopolymerizable, nitriles must be used which themselves possess this property. Such condensation products can as a rule also be copolymerized with other unsaturated compounds. If, on the other hand, such nitriles are used as are only copolymerizable, condensation products are produced which can only be polymerized in admixture with other polymerizable compounds. If it is required to produce compounds possessing not only a capacity for homo- or for copolymerization but which are also capable of condensation, that is to say are hardenable, such amide-like compounds must be used as starting materials as themselves yield hardenable methylol compounds and moreover the selection of the quantity proportions between the reaction components must be such that at least one free methylol group remains in the end product, or alternatively further methylol groups must be introduced into the end product.

The polymerization or copolymerization of the compounds available according to the invention, takes place under the customary conditions. Reference may be made in this connection to application Serial No. 375,831 and application Serial No. 375,832, filed August 21, 1953.

The properties of the new amide-like compounds can be influenced not only by the selection of the starting materials or also by the selection of the components in the copolymerization; they can, according to a further observation, also be modified by attachment to one or more double bonds of the condensation products of compounds with an active hydrogen atom, such as alcohols, phenols, amines or mercaptans. In this operation care is to be taken that not all the double bonds are saturated, so that the compounds remain polymerizable. The attachment of these compounds can be carried out by conventional methods.

The products obtainable according to the invention can be used for a variety of purposes in both the monomeric and in polymeric form. They can be employed quite generally in all cases in which condensation or polymerization resins are used. They can be used for the manufacture of moulding materials and shaped objects, of films, adhesives or lacquers. Certain of the copolymerisates exhibit rubber-like properties and are suitable as a rubber substitute which is stable to benzene and benzine. By using suitable starting materials, products can be produced which are suitable, among other purposes, as auxiliary agents in the textile, leather and paper industries. They can be used for the preparation of impregnating and coating agents, for example suitably substituted compounds can be employed for rendering textiles water-repellent. Basic products are also suitable for the animalizing of cellulosic textile materials and also as after-treating agents for improving the fastness to washing and water of dyeings and printings of water-soluble direct dyeing dyestuffs, the water-solubility of which is determined by the presence of sulfonic acid or carboxylic acid groups. Such an after-treatment may also be combined with a treatment with copper salts. The new products can also be applied in the dyeing, printing and finishing of natural or artificial fibers with pigments.

Finishes produced with the products of the present invention in general possess advantageous properties in actual use; products which are polymerizable and hardenable exhibit especially favorable properties.

The following examples illustrate the invention, the parts being by weight:

Example 1

To 300 parts of concentrated sulfuric acid there are added with cooling and stirring, 57 parts of 40 percent aqueous formaldehyde and then, within 20 minutes, 95 parts of melamine, the temperature being maintained between 5 and 15° C. Thereupon 41 parts of acrylonitrile are allowed to flow in within 15 minutes, the temperature of the reaction mixture being allowed to rise to 40° C. and then maintained at this figure by cooling. When the introduction is complete, stirring is continued for 3 hours at ordinary temperature and then the mixture poured upon ice. The sulfuric acid is carefully neutralized with caustic soda solution and the precipitate filtered off. After drying, 75 parts are obtained of a white powder which can easily be polymerized and which essentially corresponds to a melamine monomethylene acrylamide.

By the introduction of methylol groups, the condensation product may be rendered completely water-soluble, this being suitably carried out in weak alkaline aqueous solution. The water-soluble methylol compound can be recovered from the aqueous solution by spray drying.

Example 2

By heating 103 parts of benzonitrile in 300 parts of 94 percent sulfuric acid for one hour to 70° C., benzamide is produced. 30 parts of paraformaldehyde are introduced into the reaction mixture at 15–30° C. within 15 minutes. After a further 15 minutes, 53 parts of acrylonitrile are introduced at a temperature below 25° C. After 1½ hours, during which time the temperature has risen to 40° C. and fallen again, the viscous mass is poured on to ice and the precipitate filtered off. The latter is again suspended in water and the sulfuric acid which is still present is neutralized. Filtration is then carried out and the residue washed with water and finally dried at 50° C. in vacuum. 145 parts of 90 percent acrylamido-methylene benzamide are obtained, the purity of which can be determined by hydrogenation of the double bond.

Example 3

In a suitable stirring vessel, 150 parts of finely ground paraformaldehyde are dissolved in 1000 parts of 98 percent sulfuric acid by gradual introduction in portions. In this operation it is permissible to allow the temperature to rise to about 70° C. When the whole is dissolved, the mixture is cooled and while under continuous good stirring 300 parts of finely ground urea are slowly introduced at 10–20° C. When the addition of the urea is complete, stirring is further continued for about 3 hours at 10–20° C. and 265 parts of acrylonitrile are now introduced dropwise into the clear solution. Only slight evolution of heat takes place and the temperature is maintained below 35° C. by cooling as necessary. Stirring is then continued at room temperature for a total of 15 hours and the clear reaction solution is then poured out on to ice, during which only slight evolution of heat takes place. Neutralization is then carried out with 50 percent caustic soda solution with cooling so that the temperature does not rise appreciably above 10° C. When the neutralization is complete, the separated sodium sulfate is filtered off and washed with 2 liters of hot acetone which is separately collected. The aqueous filtrate is now freed under vacuum at 40° C. from the majority of the water and the additional sodium sulfate which thereby separates is also filtered off. This latter is washed with the wash acetone previously used and the aqueous solution and the acetone solution together are evaporated, initially under slightly reduced pressure and later, after the whole of the acetone has been driven off, under 14 mm. pressure. Separation of the acrylamido-methylene urea then slowly commences in the distillation flask. The product is filtered with suction and a further fraction is obtained from the mother liquor by further concentration. On recrystallization from alcohol there are finally obtained 160 parts of acrylamido-methylene urea in the form of compact prisms which melt at 130–131° C. Acrylamide can be separated by distillation under 0.03 mm. pressure from the mother liquor of the crude product.

What is claimed is:

1. A process for the manufacture of a polymerizable amide-like compound which comprises reacting in the presence of concentrated sulfuric acid as the reaction medium and in the absence of a polymerization catalyst one mol of urea with one mole of formaldehyde and one mol of acrylonitrile.

2. A process for the manufacture of a polymerizable amide-like compound which comprises reacting in the presence of concentrated sulfuric acid as the reaction medium and in the absence of a polymerization catalyst (a) urea with (b) a member selected from the group consisting of formaldehyde and paraformaldehyde, and with (c) acrylonitrile.

3. A process for the manufacture of a polymerizable amide-like compound which comprises reacting (a) urea in the presence of concentrated sulfuric acid as the reaction medium and in the absence of a polymerization catalyst with (b) formaldehyde and with (c) acrylonitrile.

References Cited in the file of this patent

UNITED STATES PATENTS

| | | |
|---|---|---|
| 2,279,497 | Sallmann et al. | Apr. 14, 1942 |
| 2,337,547 | D'Alelio | Dec. 28, 1943 |
| 2,340,045 | D'Alelio | Jan. 25, 1944 |
| 2,476,065 | Robinson | July 12, 1949 |
| 2,512,671 | Novotny et al. | June 27, 1950 |
| 2,543,094 | Brighton et al. | Feb. 27, 1951 |
| 2,679,494 | Thomas | May 25, 1954 |

OTHER REFERENCES

Buc: "The Reaction of N-Hydroxymethyl Phthalimide With Nitriles," Jour. Amer. Chem. Soc., volume 69, February 1947, pages 254–255.

Magat et al.: "Acid-Catalyzed Reaction of Nitriles," Jour. Amer. Chem. Soc., volume 73, March 1951, pages 1035–1037.